C. J. DEIBERT.
ENGINE PISTON.
APPLICATION FILED NOV. 10, 1920.

1,433,987.

Patented Oct. 31, 1922.

INVENTOR
Charles J. Deibert
By W. W. Williamson

Patented Oct. 31, 1922.

1,433,987

UNITED STATES PATENT OFFICE.

CHARLES J. DEIBERT, OF PHILADELPHIA, PENNSYLVANIA, ASSIGNOR OF ONE-HALF TO CHARLES H. PECK, OF PHILADELPHIA, PENNSYLVANIA.

ENGINE PISTON.

Application filed November 10, 1920. Serial No. 422,997.

*To all whom it may concern:*

Be it known that I, CHARLES J. DEIBERT, a citizen of the United States, residing at Philadelphia, in the county of Philadelphia and State of Pennsylvania, have invented new and useful Improvements in an Engine Piston, of which the following is a specification.

My invention relates to new and useful improvements in engine pistons, and has for its object to provide a two piece piston including a socket comprising separable elements or sections, one of said sections being formed with each piece of the piston.

Another object of the invention is to provide a ball of two sections or hemispheres for attachment to a connecting rod, said ball adapted to be mounted within the socket carried by the piston.

Another object of the invention is to provide a ball and socket connection between a piston and its connecting rod whereby said piston will remain in proper alignment within its cylinder even though the connecting rod or crank shaft is bent or out of line.

A further object of the ball and socket connection is to permit the piston to revolve within its cylinder thereby causing the cylinder walls and piston or piston rings to wear evenly so that they will remain true or circular, making it unnecessary to rebore the cylinder each time the rings are renewed.

A still further object of the invention is to construct a piston with a socket and a ball therefore whereby such piston may be applied to an engine cylinder and the connecting rod thereof without changing the construction or operation of the other parts of the engine, including the connecting rod.

Still another object of the invention is to provide two hemispheres having cavities or recesses for accommodating the head of a connecting rod and a pin carried thereby so that said hemispheres may be mounted on the connecting rod and form a ball to cooperate with a sectional socket carried by a two piece piston, one section of the socket being formed integral with the piston proper or piston head and the other section being formed integral with the piston skirt or guide ring.

With these ends in view, this invention consists in the details of construction and combination of elements hereinafter set forth and then specifically designated by the claim.

In order that those skilled in the art to which this invention appertains, may understand how to make and use the same, I will describe its construction in detail, referring by numerals to the accompanying drawings forming a part of this application, in which:—

Figure 1:
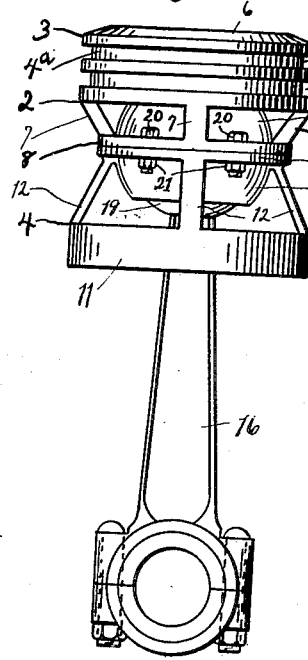
Fig. 1, is a side elevation of my improved engine piston showing it applied to a connecting rod.
Figure 2:
Fig. 2, is an edge view of the connecting rod with its connecting pin.
Figure 3:
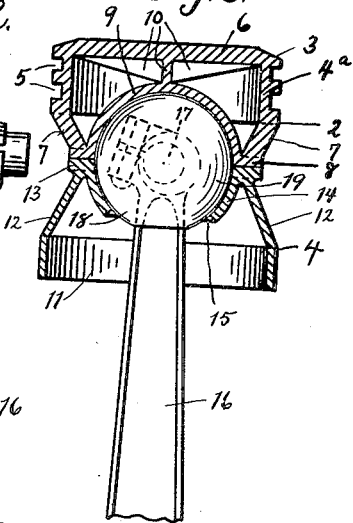
Fig. 3, is a sectional view of the piston illustrating the ball within the socket and attached to the head of the connecting rod.

In carrying out my invention as here embodied, 2 represents a piston comprising two pieces or members 3 and 4, the former being the piston proper or head and the latter the piston skirt or guide ring. The piston proper or head 3 consists of a circular body 4 having spaced circumferential piston ring grooves 5 and an end wall 6. From the lower or free edge of the body 4ᵃ project inwardly and downwardly a plurality of stays or standards 7 which are formed integral with the piston head and diverge toward the vertical or longitudinal center of the piston. With the lower ends of these stays or standards 7 is formed the integral flange ring 8, said flange ring having formed integral therewith the socket section 9, semi-circular in vertical cross section or dome shaped as shown in Fig. 3 which projects into the piston head inside of the flange ring 8 and the stays or standards 7 formed therewith. In order to strengthen the end wall 6 to efficiently withstand the engine impulses and transfer said impulses directly to the top of the socket section 9, I prefer to provide ribs 10 formed integral with said end wall 6 and the socket section 9 which radiate from the vertical or longitudinal center of the piston said ribs gradually tapering toward their outer ends as shown in Fig. 3.

The reference numeral 11 denotes the piston skirt or guide ring, the outer circumference or diameter of which is slightly greater than the outer circumference or diameter of the piston head 3 or its body 4, or should be approximately the circumference of the piston rings which are mounted in the piston ring grooves 5, said skirt or guide ring being spaced some distance from the piston head to provide the desired piston length to prevent the piston having undue lateral movement or swinging motion which would cause the piston to bind against the cylinder walls and wear grooves thereon or in other words wear the piston and cylinder to a noncircular shape or out of true. With this piston skirt or guide ring 11 are formed the integral stays or standards 12 which project upward and inwardly from the upper edge of said guide ring 11 or diverge toward the vertical or longitudinal center of the piston at their upper ends. A flange ring 13 is formed integral with the upper ends of the stays or standards 12 and with this flange ring is formed the integral socket section 14 projecting downward toward the guide ring 11 with the flange ring 13 and the stays or standards 12. In the socket section 14 is a hole 15 for the passage of the connecting rod 16, said hole being of sufficient diameter to permit the proper oscillation of the connecting rod due to the operations of the crank shaft to which the connecting rod is attached.

The connecting rod 16 carries a connecting pin 17, which is usually shorter than the one used with pistons as they are generally constructed at the present time and this connecting pin projects from two opposite sides of the connecting rod head.

On the projecting ends of said connecting pin 17 are mounted the ball sections or hemispheres 18, two of them coacting to form the ball 19 which is positioned within the socket produced by the coaction of the socket sections 9 and 14 and when thus positioned the two piston pieces or elements with their socket sections and other elements are fastened together by bolts 20 or their equivalent which pass through the flange rings 8 and 13 and where the fastening means are bolts, nuts 21 may be placed on their threaded ends.

Figures 4, 5:
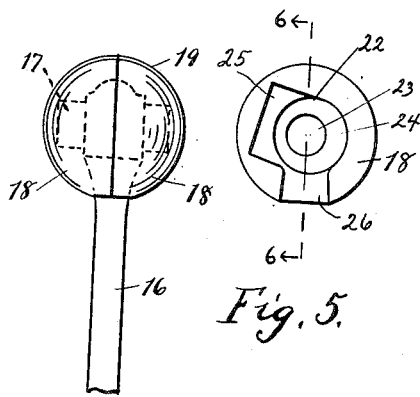
Fig. 4, is an edge view of the upper or head end of the connecting rod with ball attached.
Fig. 5, is an inner face view of one of the hemispheres forming the ball.
Figure 6:
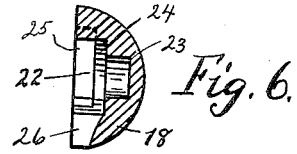
Fig. 6, is a section at the line 6—6 of Fig. 5.

Each hemisphere 18 has a recess 22 formed in its meeting face which approximately conforms to the outline of the head and upper end of the connecting rod 16 with the connecting pin rod 17 therein so that said recess registers with one-half of the upper portion of the connecting rod and its head and one end of the connecting pin. This recess consists of a number of chambers, the deepest being the pin chamber 23, the next the head chamber 24 which is eccentric to the pin chamber as in Fig. 5, the shallowest being the clamp chamber 25 which is offset from the other chambers and partially encloses the split clamp and its screw and the rod chamber 26 which leads from the head chamber to the outer circumference of the hemisphere.

The pin chamber snugly fits one end of the connecting pin 17 while the other chambers are of sufficient size to snugly pass over the parts which they house or enclose.

In practice the head of the connecting rod 16 is passed through the hole 15 in the socket section 14 after which the connecting pin 17 is placed in position and the hemispheres mounted on the projecting ends of said pin so that they enclose the connecting rod head and pin and from the ball 19 after which the piston pieces 3 and 4 are brought together until the ball is enclosed by the socket sections 9 and 14 at which time the parts are bolted together and the piston is then ready for insertion in an engine cylinder.

In operation the piston will run true in its cylinder and any inequalities or deflection in the connecting rod or crank shaft to which it is attached will be counteracted or equalized in the ball and socket connection between the connecting rod and the piston. During the reciprocations of the piston the same will also rotate upon its longitudinal axis and therefore the wear upon the parts will be equalized so that when it is necessary to replace the piston rings it will be unnecessary to rebore the cylinder.

Of course I do not wish to be limited to the exact details of construction as herein shown as these may be varied within the limits of the appended claim without departing from the spirit of my invention.

Having thus fully described my invention, what I claim as new and useful is:—

An engine piston consisting of a piston head comprising an annular body having circumferential grooves and an end wall, a plurality of stays or standards formed with the lower edge of the body, a flange ring formed with the lower ends of said standards, a socket section formed integral with the flange ring and projecting into the piston head, integral ribs formed with the end wall of the piston head and the socket section radiating from the longitudinal center of the piston head and tapering outwardly, a piston skirt or guide ring of greater diameter than the piston head body, standards formed integral with said guide ring and projecting upwardly therefrom, a flange ring formed integral with said standards, an integral socket section formed with said flange ring and projecting toward the guide ring, said socket section having a hole therein, means passing through the coacting flange rings to fasten the parts together, a ball formed of two hemispheres positioned within the socket formed by the socket sections, each of said hemispheres being recessed, a connecting rod, a connecting pin carried by said rod and the head of said connecting rod registering with the recesses of the hemispheres and housed by said hemispheres.

In testimony whereof, I have hereunto affixed my signature.

CHARLES J. DEIBERT.